(12) United States Patent
Stordy et al.

(10) Patent No.: US 9,545,169 B2
(45) Date of Patent: Jan. 17, 2017

(54) APPARATUS FOR ROASTING COFFEE BEANS

(75) Inventors: Andrew Stordy, Wadhurst (GB); Rombout Frieling, London (GB)

(73) Assignee: IKAWA LTD, London (GB)

( * ) Notice: Subject to any disclaimer, the term of this patent is extended or adjusted under 35 U.S.C. 154(b) by 865 days.

(21) Appl. No.: 13/882,583

(22) PCT Filed: Nov. 1, 2011

(86) PCT No.: PCT/EP2011/069185
§ 371 (c)(1),
(2), (4) Date: Jul. 9, 2013

(87) PCT Pub. No.: WO2012/059484
PCT Pub. Date: May 10, 2012

(65) Prior Publication Data
US 2013/0276637 A1    Oct. 24, 2013

(30) Foreign Application Priority Data
Nov. 1, 2010 (GB) .................................. 1018349.9

(51) Int. Cl.
*A47J 31/42*     (2006.01)
*A23B 4/03*      (2006.01)
(Continued)

(52) U.S. Cl.
CPC .............. *A47J 31/42* (2013.01); *A23F 5/02* (2013.01); *A23F 5/046* (2013.01); *A23N 12/08* (2013.01);
(Continued)

(58) Field of Classification Search
CPC ........... A47J 31/42; A47J 27/04; A21B 7/005; A23L 1/1815; A23L 3/365; A23N 7/005; A23N 12/08; A23B 4/052; A21D 6/003; A23F 5/04; A23F 5/046; F26B 3/08; F26B 3/084; F26B 3/0923; F26B 23/026; F26B 17/10; F26B 17/107; B01J 8/44; B01D 1/18; H01L 21/67109; F27B 7/2025
(Continued)

(56) References Cited

U.S. PATENT DOCUMENTS 1,896,230 A    2/1933  Farago
2,497,501 A    2/1950  Himmel et al.
(Continued)

FOREIGN PATENT DOCUMENTS

AU    WO 9109540 A1 *  7/1991  ............. A23N 12/08
CA    2304324          9/2000
(Continued)

OTHER PUBLICATIONS

International Search Report for corresponding International Application No. PCT/EP2011/069185, mailed May 21, 2012.
(Continued)

*Primary Examiner* — Dana Ross
*Assistant Examiner* — Hemant Mathew
(74) *Attorney, Agent, or Firm* — Jason H. Vick; Sheridan Ross, PC (57) ABSTRACT

One embodiment of the invention relates to apparatus (10) for roasting coffee beans, the apparatus comprising: a chamber (12) in which a supply of coffee beans can be received for roasting; means (15) for heating air; and means (20) for driving heated air into the chamber (12) for roasting coffee beans received therein; wherein the air driving means (20) and chamber (12) are configured and arranged so that coffee beans located in the chamber (12) circulate generally horizontally about the periphery of the chamber (12) when the air driving means (20) drives heated air into the chamber (12).

21 Claims, 9 Drawing Sheets

(51) Int. Cl.

| | | |
|---|---|---|
| *A23B 4/044* | (2006.01) | |
| *B60H 3/00* | (2006.01) | |
| *F26B 3/08* | (2006.01) | |
| *F26B 17/00* | (2006.01) | |
| *A23F 5/02* | (2006.01) | |
| *A23F 5/04* | (2006.01) | |
| *A23N 12/08* | (2006.01) | |
| *B01J 8/44* | (2006.01) | |
| *A23N 7/00* | (2006.01) | |

(52) U.S. Cl.
CPC ...... *A23N 7/005* (2013.01); *B01J 8/44* (2013.01); *F26B 3/08* (2013.01); *Y02P 60/83* (2015.11)

(58) Field of Classification Search
USPC .......... 99/286, 348, 323.5, 473, 474, 475, 477,99/479, 483; 426/466, 467, 465; 34/359, 360, 34/362–369, 576–581, 592–594
See application file for complete search history.

(56) References Cited

U.S. PATENT DOCUMENTS

| | | | | |
|---|---|---|---|---|
| 2,783,149 | A | * | 2/1957 | Epstein .............. A23F 5/26 426/432 |
| 4,196,342 | A | | 4/1980 | Chailloux |
| 4,322,447 | A | | 3/1982 | Hubbard |
| 4,325,191 | A | | 4/1982 | Kumagai et al. |
| 4,425,720 | A | | 1/1984 | Elevitch |
| 4,484,064 | A | | 11/1984 | Murray |
| 4,489,506 | A | | 12/1984 | Brown et al. |
| 4,597,190 | A | | 7/1986 | Camerini |
| 4,698,916 | A | | 10/1987 | Farber |
| 4,895,308 | A | | 1/1990 | Tanaka |
| 4,925,682 | A | | 5/1990 | Miya |
| 5,185,171 | A | | 2/1993 | Bersten |
| 5,193,444 | A | | 3/1993 | Bar-Sheshet |
| 5,269,072 | A | | 12/1993 | Waligorski |
| 5,292,005 | A | | 3/1994 | Wireman et al. |
| 5,322,005 | A | * | 6/1994 | Enomoto .............. A47J 31/42 241/100 |
| 5,500,237 | A | * | 3/1996 | Gell, Jr. .............. A23F 5/046 34/360 |
| 5,564,331 | A | | 10/1996 | Song |
| 5,749,288 | A | | 5/1998 | Skaling |
| 5,890,418 | A | | 4/1999 | Song |
| 5,943,790 | A | | 8/1999 | Gell, Jr. |
| 5,960,561 | A | | 10/1999 | Parodi et al. |
| 6,051,266 | A | * | 4/2000 | Totsuka .............. A23N 12/08 426/466 |
| 6,053,093 | A | | 4/2000 | Gerhardt et al. |
| 6,112,644 | A | | 9/2000 | Song |
| 6,942,887 | B1 | | 9/2005 | Freedman |
| 6,988,444 | B1 | | 1/2006 | Pfeifer et al. |
| 2001/0001349 | A1 | | 5/2001 | Moon et al. |
| 2003/0207010 | A1 | | 11/2003 | Moon et al. |
| 2004/0000239 | A1 | | 1/2004 | Munk |
| 2005/0238767 | A1 | | 10/2005 | Poss |
| 2009/0031900 | A1 | | 2/2009 | Barraclough et al. |
| 2009/0031902 | A1 | | 2/2009 | White et al. |

FOREIGN PATENT DOCUMENTS

| | | |
|---|---|---|
| DE | 36 36 999 | 5/1988 |
| DE | 197 31 821 | 1/1999 |
| DE | 102 23 369 | 6/2003 |
| EP | 0213645 | 3/1987 |
| EP | 0676148 | 10/1995 |
| EP | 0715826 | 6/1996 |
| ES | 2 112 572 | 4/1998 |
| FR | 2 593 055 | 7/1987 |
| FR | 2 603 169 | 3/1988 |
| GB | 2 071 480 | 9/1981 |
| GB | 2 485 073 | 5/2012 |
| NL | 8700060 | 8/1988 |
| WO | WO 91/09540 | 7/1991 |
| WO | WO 97/16985 | 5/1997 |
| WO | WO 97/28696 | 8/1997 |
| WO | WO 02/21944 | 3/2002 |
| WO | WO 03/031893 | 4/2003 |
| WO | WO 03/092398 | 11/2003 |
| WO | WO 2005/053484 | 6/2005 |
| WO | WO 2006/034203 | 3/2006 |
| WO | WO 2007/021650 | 2/2007 |
| WO | WO 2007/082857 | 7/2007 |

OTHER PUBLICATIONS

Written Opinion for corresponding International Application No. PCT/EP2011/069185, mailed May 21, 2012.

United Kingdom Search Report for corresponding application No. GB1018349.9, mailed Feb. 25, 2011.

United Kingdom Search Report for corresponding application No. GB 1118813.3, mailed Feb. 23, 2012.

* cited by examiner

APPARATUS FOR ROASTING COFFEE BEANS

CROSS REFERENCE TO RELATED APPLICATIONS

This application is a national stage application under 35 U.S.C. 371 of PCT Application No. PCT/EP2011/069185 having an international filing date of 1 Nov. 2011, which designated the United States, which PCT application claimed the benefit of Great Britain Application No. 1018349.9 filed 1 Nov. 2010, each of which are incorporated herein by reference in their entirety.

FIELD

The present invention relates, in one embodiment, to apparatus for roasting coffee beans. In another illustrative embodiment, the invention relates to an integrated coffee bean roasting and grinding apparatus. In a further embodiment the apparatus relates to an integrated roasting, grinding and coffee brewing apparatus.

BACKGROUND

Coffee is widely consumed throughout the world and whilst the coffee supply business is generally considered to be fairly lucrative, it is often the case that not all parties in the supply chain derive the same financial benefit.

In a typical supply chain, farmers (often in third world countries) grow and harvest coffee cherries. These cherries are then subjected to a number of processing operations that remove the flesh and a paper-like skin (known as "parchment") to leave raw coffee beans (otherwise known as "green" coffee beans). These beans are then sold for a relatively small amount of money to processing organisations (often in Europe or North America) that roast and grind the beans on a commercial scale. The processing organisations then sell the roasted beans and ground beans to retailers at a much inflated price, and the retailers then sell to the general public, again at a much increased price.

A problem with this arrangement is that farmers are often not fairly rewarded for their efforts, as the farmers will typically only receive a small percentage of the final sale price. Not only is this arrangement bad for the farmers, but it is also bad for consumers as they will typically have to pay much higher prices than if they had been able to source their coffee directly from the farmers, or even from the processors.

Another problem with this arrangement is that roasted coffee beans tend not to stay fresh for as long as green coffee beans, and as a consequence a consumer's cup of coffee is not as fresh as it would have been had the beans been kept in their unroasted "green" state until used. This problem is exacerbated when roasted coffee beans are ground, and to counteract this many manufacturers vacuum pack their ground coffee before supplying it to consumers. Whilst vacuum packing ground coffee does help to keep the coffee fresh, consumers can find that coffee quickly goes stale once the vacuum seal is broken.

To attempt to provide consumers with a fresher cup of coffee, it has previously been proposed to provide domestic roasting apparatus so that consumers can roast their own green coffee beans.

One such device is disclosed in U.S. Pat. No. 5,185,171. This US Patent discloses a roaster for coffee beans or the like where beans are fed into a roasting air stream at an air stream entrance. The air stream blows the beans from the entrance and generally upwards along a bean guide to an altitude from which they drop back into a hopper and from thence back to the entrance. The hopper includes a constriction which controls the rate of admission of the beans into the air stream, and the bean guide includes a valve that can be opened so that beans are diverted out of the roaster once they have been roasted.

Whilst this apparatus does enable consumers to roast their own coffee beans it is relatively noisy in operation, and as it typically takes several minutes to roast a supply of beans the apparatus is much more intrusive in a domestic environment than other items of domestic kitchenware, such as a kettle for example. This problem is exacerbated by the fact that as the apparatus vertically circulates the beans; the fan needs to operate at a relatively high speed. Another problem with this apparatus is that the provision of a mechanical valve to allow roasted beans to be blown from the roaster introduces additional moving parts, and hence provides additional parts that could potentially malfunction.

A further problem to be addressed is that correctly roasting beans is something of a black art, in that certain beans will respond differently to different roasting processes (for example, processes that roast beans for different lengths or time or at different temperatures). Since domestic bean roasters of the type described above subject all beans to the same roasting process, not all of these beans will be roasted as well as they might otherwise be were the roasting process to be controllable. However, whilst providing users with the ability to control the roasting process may well be appreciated by some users, there will likely be others who find the controls too confusing. Even those users who are comfortable controlling the process themselves would likely find, after the novelty had worn off, such a device to be tedious and difficult to use properly.

As it is advantageous for consumers to be able to roast their own coffee beans, it would be beneficial if the aforementioned problems could be addressed.

SUMMARY

To that end a presently preferred embodiment of the invention provides apparatus for roasting coffee beans, the apparatus comprising: a chamber in which a supply of coffee beans can be received for roasting; means for heating air; and means for driving heated air into the chamber for roasting coffee beans received therein; wherein the air driving means and chamber are configured and arranged so that coffee beans located in the chamber circulate generally horizontally about the periphery of the chamber when the air driving means drives heated air into the chamber.

The principal advantage of this arrangement is that the energy required to horizontally circulate the beans is much less than that required to vertically circulate the beans, and hence the apparatus as a whole operates significantly more quietly than the aforementioned previously proposed device.

In an envisaged implementation, the chamber comprises an outlet for roasted coffee beans. In another arrangement, at least a portion of said chamber is generally conical and expands in diameter towards said outlet. The chamber may include a plurality of circumferential air inlets, the air driving means being configured to drive air through said inlets into said chamber. The air inlets may be configured so that air enters the chamber tangentially to a peripheral wall of the chamber to horizontally circulate the beans. In another envisaged implementation, a floor of the roasting chamber may be provided with a plurality of radial slots through which air may be injected into the roasting chamber to swirl coffee beans provided therein.

An advantage of at least some of these arrangements is that the air driving means tends to create a vortex-like airflow within the chamber that effectively circulates the beans as they roast.

In one embodiment the air driving means may be operable to drive air into the chamber to lift roasted coffee beans from the chamber to said outlet. An advantage of this arrangement is that by using the air driver to evacuate the beans from the chamber, one need not provide mechanical valves of the type previously proposed (which valves needlessly introduce moving parts that may fail to operate properly).

In one envisaged arrangement, the air driving means may be configured to drive cooler air into the chamber to quench the roasted beans after they have been roasted. In another envisaged arrangement, the air driving means may be configured to drive cooler air into the chamber to quench the roasted beans and lift the beans towards the outlet.

In preferred embodiments, the apparatus may comprise a controller operable to control the air driving means to vary the rate at which air is driven into the chamber. The controller may be configured to control the air driving means to drive air into the chamber at a first range of rates to circulate the beans as they roast, and at a second range of rates higher than the first range to lift the beans towards the outlet. An advantage of these arrangements is that the air driving means can be operated at a relatively low (usually quieter) rate for much of the roasting process, and then operated at a higher (usually noisier) rate only when it is desired to remove the beans from the roasting chamber.

In one envisaged arrangement, the controller may be configured to vary, within said first range, the rate at which air is driven into the chamber to account for changes in volume and weight of the beans as they roast. The advantage of this arrangement is that as the beans roast they tend to increase in size and decrease in weight, and hence less energy is required to horizontally circulate them about the periphery of the roasting chamber. As such, the air driving means can be controlled to reduce the rate at which air is driven into the chamber, thereby enabling the air driving means to operate more quietly.

In one envisaged embodiment, the controller may be configured to vary the rate at which air is driven into the chamber in accordance with a predetermined process profile. The predetermined process profile may comprise, for a given roasting process, variations in the rate at which hot air is to be driven into the chamber over time. The predetermined process profile may include information relating to one or more other factors such as a roasting time, a roast temperature and a quench time. In a particularly preferred implementation the process profiles may be tailored for particular types of beans.

In one embodiment, the apparatus comprises a store for process profiles, each said profile being retrievable for implementation by said controller. Preferably the process profiles are tailored for particular types of coffee beans, a said profile being selected (preferably automatically) by said controller in accordance with the type of beans to be roasted. By virtue of this arrangement, it is possible to select a process profile that is appropriate for the particular beans that are to be roasted. It is also envisaged to provide a user with the ability to store their own process profiles, should they wish to.

In a particularly preferred arrangement, the apparatus may comprise an input interface operable by a user to indicate to the controller the type of beans to be roasted, the controller being responsive to information input by means of said interface to automatically select a profile from said store that is appropriate for the type of beans to be roasted. In another arrangement, the controller may select more than one candidate process profile, and prompt the user to select one of the candidate profiles for the roasting process to be undertaken. In yet another arrangement, a user could be guided through the process of building a profile by being provided with the ability to select different parameters. In one envisaged implementation, the input interface may comprise a sensor, such as a bar-code reader or an RFID sensor, operable to read information from a packet of coffee beans. These arrangements provide a particularly easy way for users to configure the apparatus for roasting a particular type of coffee bean.

In one configuration the apparatus may comprise a housing within which the chamber, heating means and driving means are located, the housing including an outlet through which air blown into the chamber can escape. The apparatus may further comprise means operable to filter air flowing from the housing through the outlet, and optionally means operable to determine the rate of air flow through said filter means.

In a particularly preferred arrangement, the controller is responsive to said flow determining means to vary the rate at which air is driven into said chamber, for example the controller may be responsive to said flow determining means to increase the rate at which air is driven into said chamber as the filter means becomes progressively more blocked. This latter arrangement avoids the problem of the flow rate being insufficient to transfer beans from the roasting chamber when the filter has become partly or wholly blocked.

The controller may be configured to activate an indicator when the flow determining means identifies that the rate of air flow through the filter means has dropped below a predetermined threshold, the indicator functioning to advise a user that said filter means should be replaced.

In another implementation the apparatus may comprise a dosing module configured for dosing the chamber with a measure of coffee beans to be roasted.

The apparatus described herein may further comprise a storage receptacle in communication with said outlet, the storage receptacle being configured for receiving and storing roasted coffee beans received from said chamber via said outlet.

In another envisaged arrangement the apparatus may comprise a grinding module in communication with said outlet, the grinding module being configured to receive roasted coffee beans from said chamber via said outlet and to grind said roasted coffee beans.

In yet another envisaged arrangement, the apparatus may comprise a brewing module configured to receive ground coffee beans from said grinding module, and to pass heated water through said ground coffee beans and into a receptacle.

In another embodiment, the invention relates to apparatus for roasting and grinding coffee beans, the apparatus comprising: a chamber in which a supply of coffee beans can be received for roasting, the chamber comprising an outlet for roasted coffee beans; a grinding module coupled to the outlet of the roasting chamber; means for heating air; and means for driving heated air into the chamber for roasting coffee beans received therein; wherein the air driving means and chamber are configured and arranged so that coffee beans located in the chamber circulate generally horizontally about the periphery of the chamber when the air driving means drives heated air into the chamber to roast beans received therein, and the air driving means is further operable to drive air into the roasting chamber to lift roasted coffee beans to and through said outlet and into said grinding chamber for grinding thereby.

In yet another embodiment, the invention relates to apparatus for roasting and grinding coffee beans, and for brewing coffee from roasted and ground coffee beans, the apparatus comprising: a chamber in which a supply of coffee beans can be received for roasting, the chamber comprising an outlet for roasted coffee beans; a grinding module coupled to the outlet of the roasting chamber; a brewing module coupled to an outlet of the grinding module, the brewing module being configured to receive ground coffee from the grinding module and to pass heated water through the ground coffee into a receptacle; means for heating air; and means for driving heated air into the chamber for roasting coffee beans received therein; wherein the air driving means and chamber are configured and arranged so that coffee beans located in the chamber circulate generally horizontally about the periphery of the chamber when the air driving means drives heated air into the chamber to roast beans received therein, and the air driving means is further operable to drive air into the roasting chamber to lift roasted coffee beans to and through said outlet and into said grinding chamber for grinding thereby.

In each of these embodiments, the apparatus may comprise a cyclonic separator (also referred to herein as a vortex generator) interposed between the outlet of the roasting chamber and an inlet of the grinding or storage module, the cyclonic separator being operable to separate out chaff in the airstream from the roasting chamber.

In another embodiment, the apparatus comprises apparatus for roasting coffee beans, the apparatus comprising: a chamber in which a supply of coffee beans can be received for roasting; a heater for heating coffee beans received in the chamber; and means for driving air into the chamber whilst coffee beans are roasting therein; wherein the air driving means and chamber are configured and arranged so that coffee beans located in the chamber circulate generally horizontally about the periphery of the chamber when the air driving means drives air into the chamber. In this embodiment, the heater may be configured to heat air that is then driven into the chamber, or in another arrangement the heater may be configured to directly heat the beans (for example, the heater may comprise one or more electrical filaments).

Other features, advantages and embodiments of the invention are set out hereafter.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

As foreshadowed above, embodiments of the present invention relates to apparatus for roasting coffee beans; to apparatus for roasting and grinding coffee beans, and finally to apparatus for roasting and grinding coffee beans, and for brewing coffee from roasted and ground coffee beans.

In the following description, particular reference will be made to apparatus for roasting and grinding coffee beans, but it should be noted that this description is merely illustrative and is not a limitation of the scope of the present invention. As set out in the accompanying claims, the scope of the present invention includes apparatus for roasting coffee beans (which apparatus is used in each of the aforementioned embodiments), and it should be remembered that protection is claimed for the roasting apparatus in isolation.

With the above provisos in mind, reference will now be made to FIG. 1 of the accompanying drawings in which there is depicted an illustrative apparatus 10 for roasting and grinding coffee beans. Such apparatus 10 is provided with apparatus for roasting coffee beans that is common to all embodiments of the present invention. The apparatus for roasting coffee beans comprises a roasting chamber 12 which defines a first volume 14, a heater 15 (such as an electrical filament) for heating air, and a means 20 (such as a fan) for driving heated air over coffee beans located in the roasting chamber 12. The stream of heated air from the air driving means serves both to circulate the coffee beans in the roasting chamber and to roast the beans as they circulate.

Figure 1:
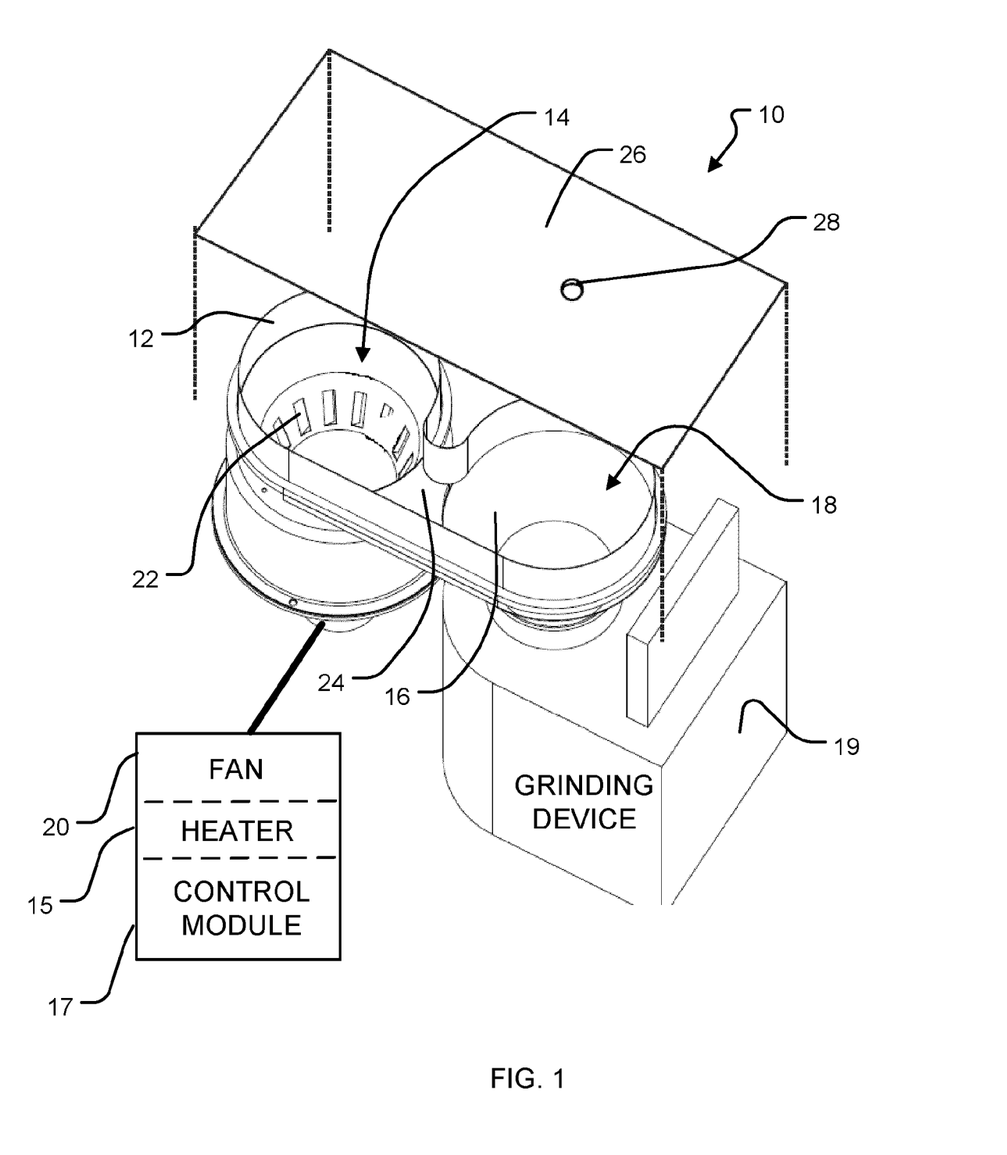
FIG. 1 is a perspective view of apparatus embodying the teachings of the present invention.
Figure 2:
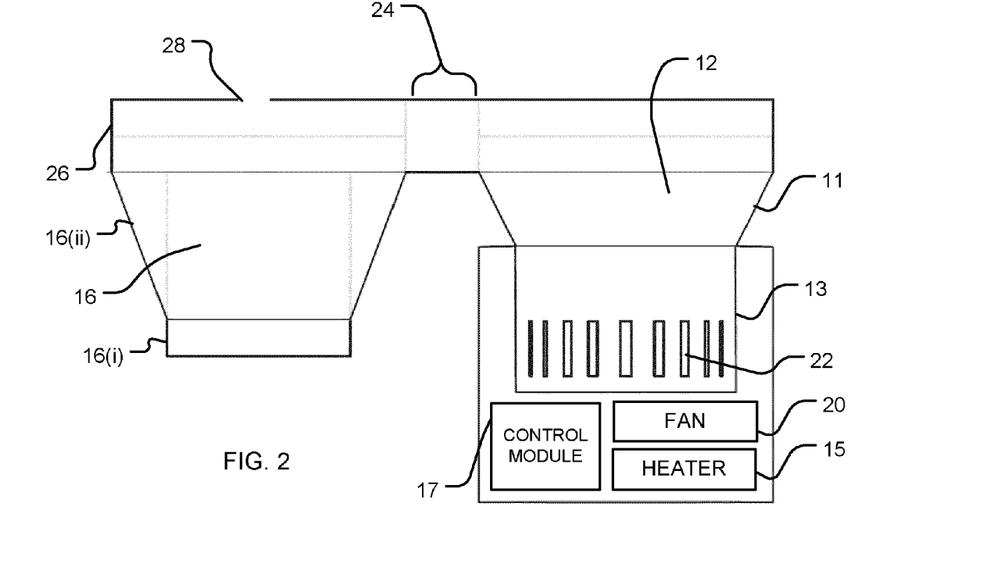
FIG. 2 is a schematic cross sectional view of the apparatus depicted in FIG. 1.
Figure 3:
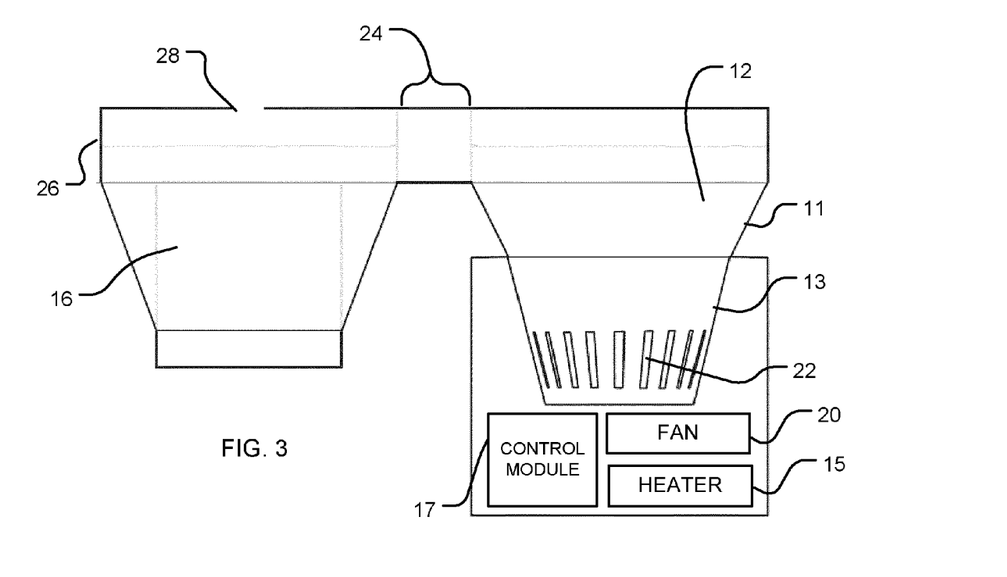
FIG. 3 is a schematic cross sectional view of apparatus in accordance with another embodiment.

As shown in FIG. 1, and in more detail in FIG. 2, the roasting chamber 12 defines one or more (typically a plurality of) openings 22 through which the air driving means 20 is configured to blow hot air after such air has been heated by the aforementioned heater 15. In one envisaged arrangement, as shown in FIG. 2, the roasting chamber comprises a first portion 13 proximate the air driving means 20 that has a generally constant diameter, and a second portion 11 distal from the air driving means which has a diameter that increases from the junction between the first and second portions. In another arrangement that is not shown in the drawings, the first portion and the second portion are each generally conical, with the second portion increasing in diameter at the same rate as the first portion. In other envisaged arrangements, the second portion 11 may increase in diameter at a greater rate than the first portion 13 (as shown in FIG. 3), or indeed at a lesser rate than the first portion.

The air driving means 20 and the roasting chamber cooperate to cause hot air to circulate horizontally round the periphery of the roasting chamber. In particular, hot air is injected tangentially to the circumference of the roasting chamber by the air driving means to form a vortex or cyclone that carries the beans circumferentially around the chamber. The vortex simultaneously roasts the beans and agitates them as they circulate (thereby ensuring that all the beams are exposed to the hot air).

In another envisaged implementation, a vortex may be created in the roasting chamber by forming a plurality of radial slots in a floor of the roasting chamber—the slots being configured to inject air into the roasting chamber at a tangent to the plane of the roasting chamber floor. A variety of other mechanisms for circulating the beans in the roasting chamber will be apparent to persons of ordinary skill in the art.

The roasting chamber 12 includes an outlet that opens to a connecting channel 24 that couples, in this particular embodiment, the roasting chamber to a grinding component 19. In another envisaged embodiment, the connecting channel may couple the roasting chamber 12 to a storage component. In another envisaged embodiment, the connecting channel may couple the roasting chamber 12 to an outlet for roasted beans.

In the embodiment depicted in the drawings, the grinding component 19 is, adjacent to the roasting component 18. The grinding component comprises a grinding chamber 16 that defines a second volume 18, and a grinding device 19 for grinding roasted coffee beans located in the grinding chamber 16. In one envisaged arrangement the grinding chamber 16 has a first portion 16(*i*) of generally constant diameter, and a second portion 16(*ii*) extending from the first portion that is generally conical and of expanding diameter.

In the embodiments of the invention, the air driving means is operable to transfer roasted coffee beans from the roasting component, for example to the grinding or storage components, or to the aforementioned outlet. To implement this functionality, the air driving means 20 is configured to inject air into the roasting chamber at a first lower rate or range of rates to circulate and roast the coffee beans, and to inject air into the roasting chamber at a second higher rate or range of rates to blow roasted coffee beans out of the roasting component, for example through the connecting channel 24. When the air driving means is comprises a fan, this functionality may be implemented by running the fan at a first lower fan speed or range of fan speeds and a second higher fan speed or range of fan speeds. As will be appreciated, by providing the roasting chamber 12 with walls that are at least partly conical, it is easier for the air driving means 20 to blow coffee beans from the roasting chamber 12, for example through the connecting channel 24 and into the grinding chamber 16.

The apparatus 10 also comprises a control module 17 that is operable (in a preferred embodiment) to control operation of the heater 15 and the air driving means 20. In particular, the control module is configured to operate the heater 15 to heat the air to a temperature suitable for roasting the coffee beans, to operate the air driving means for a predetermined period of time to blow hot air through the beans to roast and circulate them, and to operate the air driving means to blow roasted coffee beans out of the roasting chamber. The control module may also, in some embodiments, be configured to operate the grinding component to grind roasted beans deposited therein, and (optionally) to operate a brewing component to produce coffee from ground coffee produced by the grinding component.

In a preferred embodiment, the control module is configured to vary the rate at which air is injected into the roasting chamber by the air driving means to account for changes in the volume and weight of the beans as they roast. In particular, as the beans roast so they become lighter and larger, and hence less energy is required to circulate the beans around the roasting chamber. To accommodate this, the control module is, in one envisaged embodiment, configured to operate the air driving means in accordance with a predetermined process profile that decreases the rate at which air is driven into the roasting chamber during the roasting process. This arrangement is advantageous as it saves energy, reduces noise, and reduces the chance of beans being driven from the chamber before they are properly roasted.

In one envisaged arrangement the control module may include or be coupled to a memory (not shown) in which a plurality of process profiles are stored, each said profile being configured for roasting a particular type of bean. For example, the process profile for a given type of bean may define the temperature of the air to be injected into the roasting chamber to roast the beans (which temperature need not necessarily be constant for the entire roasting process), the time for which the beans are to be roasted, and the rate at which the air driving means injects hot air into the roasting chamber over the course of the roasting process. The process profile may also define a quench time for which cooler air is injected into the roasting chamber to quench roasted beans before they are transferred from the roasting chamber.

The aforementioned process profiles may be pre-stored in the aforementioned memory when the apparatus is manufactured. In other arrangements, the process profiles may be loadable into the memory, for example by means of an arrangement that is later described. In still other arrangements, the apparatus may be configured to enable a user to select process profiles and/or configure their own process profiles (for example from prestored profile components).

As shown in the figures (for example in FIGS. 1 to 3), the apparatus 10 also comprises a cover 26 which is configured—in this embodiment—to be fitted over the respective roasting and grinding chambers 12, 16 and the connecting channel 24. In such an arrangement the cover member 26 is configured to enclose the first and second volumes 14, 18 in communication with the connecting channel 24. In another envisaged arrangement however the cover member 26 comprises two or more separate parts which are each configured to be fitted over different parts of the preparation device 10 such as the individual roasting and grinding chambers 12, 16. As will be appreciated, the cover member functions to prevent coffee beans from escaping from the apparatus whilst they are being roasted or ground. In embodiments where the apparatus comprises only a roasting component, the cover is configured to fit over that roasting component to stop beans from escaping whilst they are being roasted.

As shown in FIGS. 1 to 3, the cover member 26 defines an opening 28 that may be located above the grinding chamber 16 or the roasting chamber 12 when the cover member 26 is fitted thereover. The opening 28 allows smoke from the roasting process to escape from the apparatus 10, and also allows air blown by the air driving means 20 to escape (particularly when the air driving means blows roasted beans out of the roasting chamber). As will be appreciated, the cover and aperture cooperate with the other components to provide an air flow which guides roasted coffee beans, out of the roasting chamber 12—for example into the grinding chamber 16. The aperture may be left open, as shown in FIG. 2, or may be closed by a filter 50 (FIG. 3) that is configured to capture smoke in the airflow from the roasting component.

In an envisaged arrangement, the filter module may be associated with a means (such as a mass flow sensor—not shown) for measuring the rate at which air escapes through the filter, and the control module may be configured to vary the rate, within the aforementioned second range, at which air is injected into the roasting chamber to account for the filter becoming progressively more blocked as the apparatus is operated over time. In particular, as the means for measuring the rate of air escape indicates that the rate of air escape is diminishing, so the control module may be configured to increase the rate at which air is injected into the roasting chamber. When the rate of air injection cannot be further increased, or when the rate of air escape drops below a predetermined threshold, the control module may be configured to operate an indicator that advises the user to change the filter 50, and if the filter is not changed the control module may be configured to operate a bypass valve (not shown) that allows air to bypass the filter module. In another envisaged arrangement, the rate of air flow may be determined by measuring the pressure upstream of the fan and the fan rpm. Using these parameters and a map of the fan performance the air flow can be calculated.

The control module may also be configured, irrespective of the condition of the filter, to open the aforementioned bypass valve when the air driving means is operated to lift beans from the roasting chamber.

In one envisaged implementation the filter module may be supplied within packaging containing coffee beans that are to be roasted. In a particularly preferred implementation the filter module may comprise a section of packaging that is configured to be detached from the remainder and inserted into an appropriate holder in the apparatus. In currently envisaged implementations, the filter material may comprise activated carbon, for example impregnated into a web of material such as a piece of cloth. In a particularly preferred arrangement the filter may comprise a box (for example, packaging in which green coffee beans are supplied to consumers) with one or more sidewalls made from activated carbon cloth. In another envisaged arrangement, packaging in which green coffee beans are retailed (for example, an enclosure such as a box) may include the filter as a removable (for example, detachable) component of the packaging. In this implementation the filter component may be covered by a cover that can be removed when the filter is detached from the remainder of the packaging.

Figure 4:
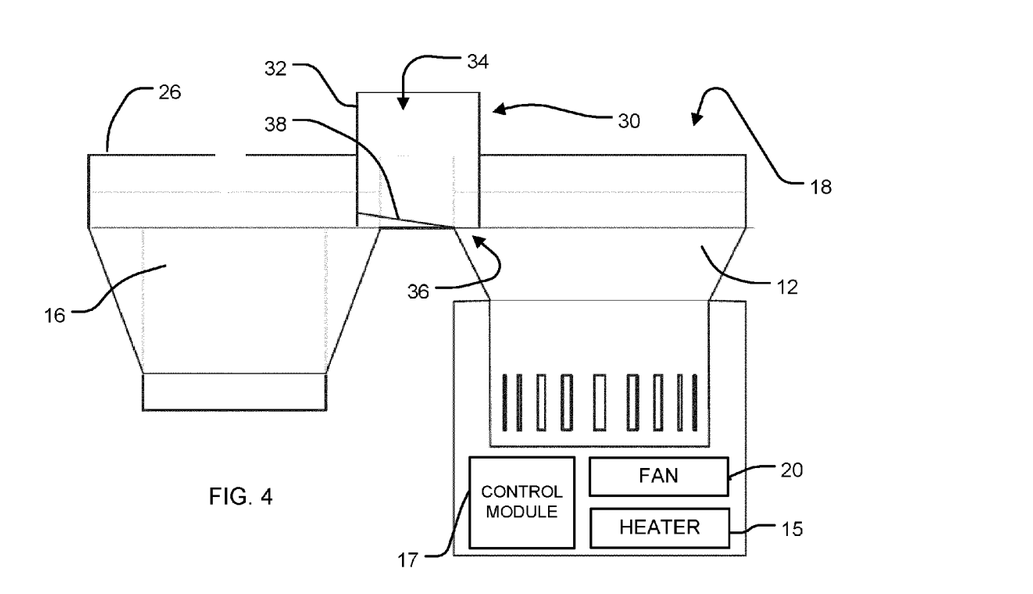
FIG. 4 is a schematic cross sectional view of another apparatus, similar to that depicted in FIG. 1.

Referring now to FIG. 4, in a preferred arrangement each of the aforementioned embodiments of the apparatus 10 may comprise a dosing component in the form of a dosing chamber 32 that receives a supply of coffee beans that are to be roasted and ground. The dosing chamber is movable between different operating configurations, and in one such dosing configuration (shown in FIG. 4) the dosing chamber 32 defines an opening 36 which is configured to communicate with the first volume 18 defined within the roasting chamber 12 such that coffee beans introduced into the dosing chamber 32 may fall under gravity into the roasting chamber 12. In a preferred arrangement the dosing chamber 32 has an inclined floor portion 38 which, as depicted in FIG. 7, makes it easier for coffee beans introduced into the dosing component 32 to fall from within the dosing chamber 12 into the roasting chamber 12.

Figure 6:
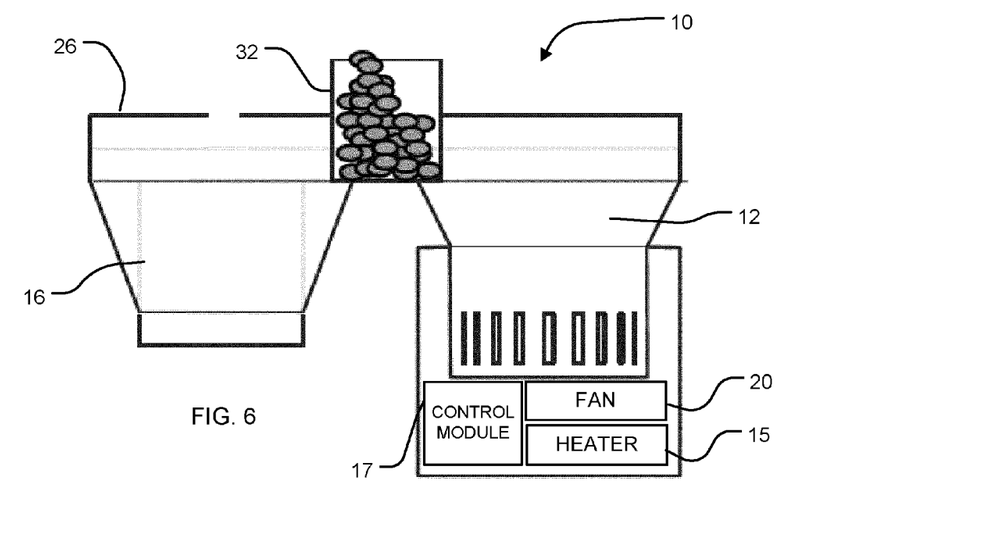
FIGS. 6 and 7 are schematic cross sectional views of the apparatus depicted in FIG. 4 in various operating configurations.

In an envisaged implementation the dosing chamber 32 extends through the cover member 26 and is configured to move (preferably to be rotatable) between the dosing configuration (shown in FIGS. 4 & 7), and a measuring configuration (shown in FIG. 6).

In the measuring configuration the opening 36 is not in communication with the first volume 18 defined within the roasting chamber. This provides that coffee beans are therefore restricted from falling from within the dosing chamber 32 into the roasting chamber 12. In one envisaged arrangement the dosing chamber 32 may be provided with an indicator (such as a line) for indicting to a user the level to which the dosing chamber 32 should be filled with beans for proper operation of the apparatus.

Figure 7:
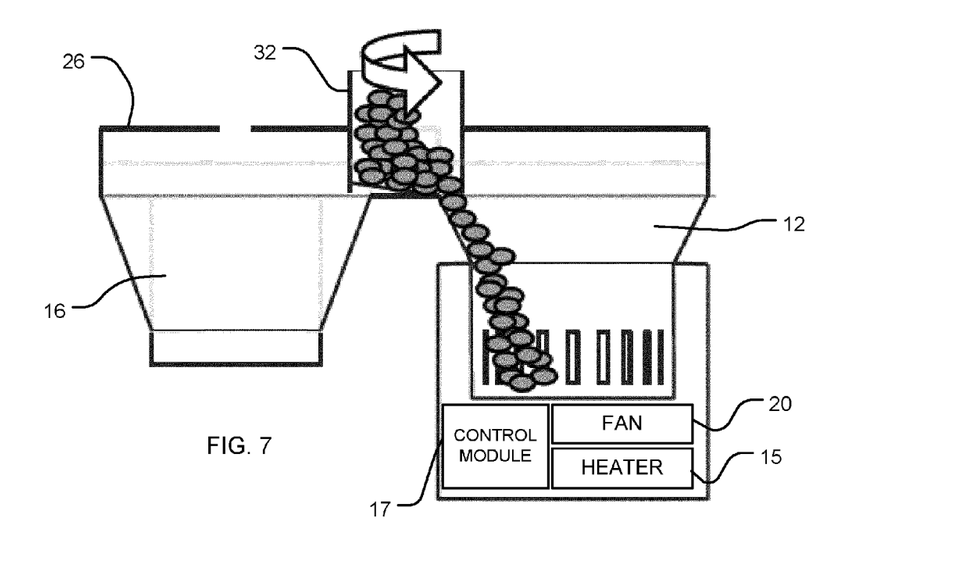
Figure 8:
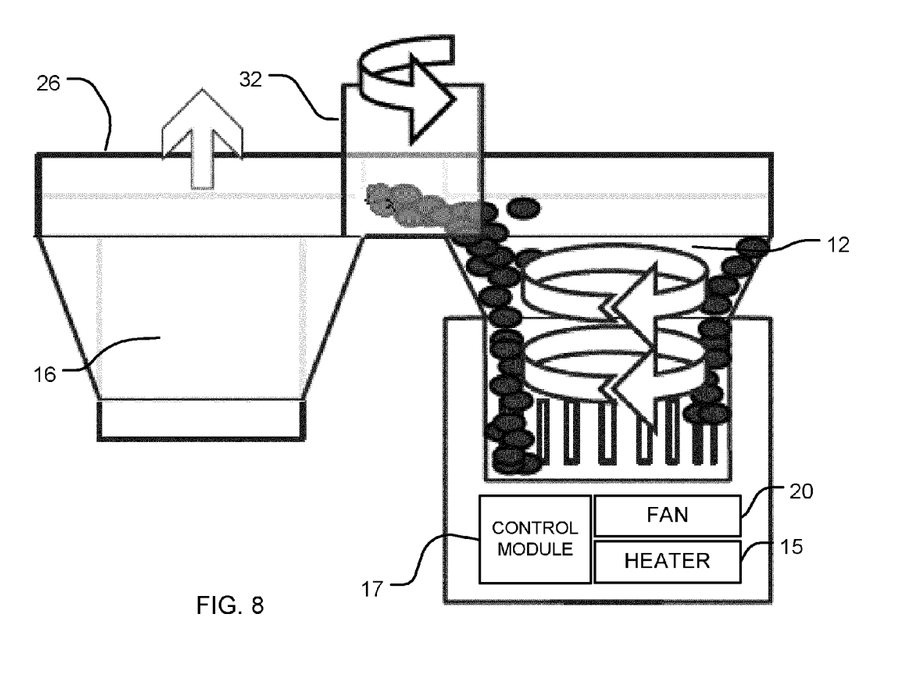
FIGS. 8 to 12 are schematic cross-sectional views of the apparatus depicted in FIG. 1 in various operating configurations.

Now with reference to FIG. 7, the dosing chamber 32 is rotated into the aforementioned dosing configuration so that the coffee beans contained therein fall into the roasting chamber 12. Once the coffee beans have fallen into the roasting chamber 12 (as shown in FIG. 8) the dosing chamber 32 is rotated back into the aforementioned measuring configuration (either manually by a user, by means of a spring or by means of an electro-mechanical device such as a servo).

Figure 5:
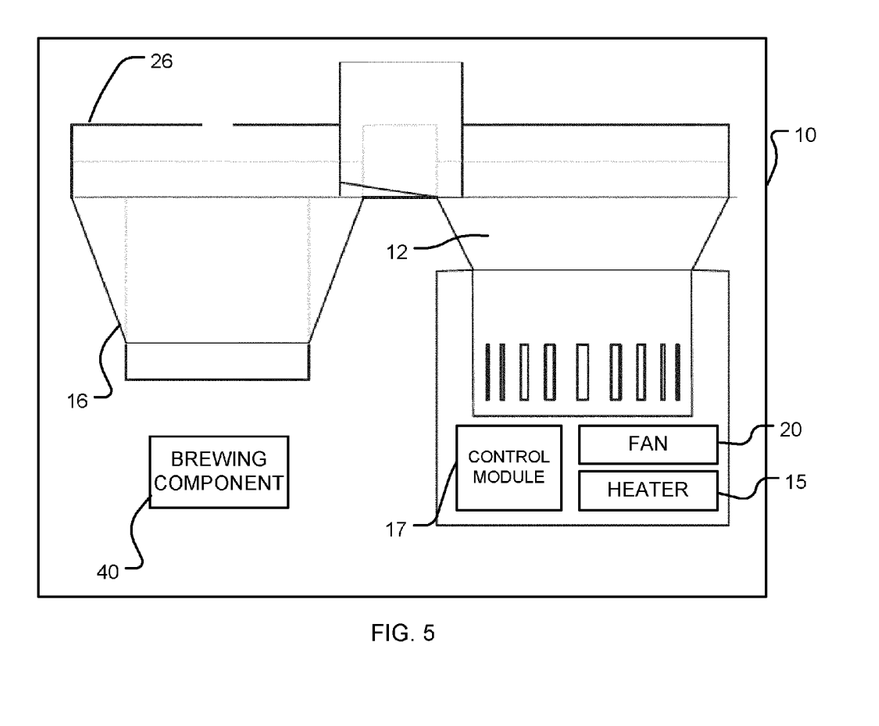
FIG. 5 is a schematic cross sectional view of another apparatus that incorporates a brewing component.

As shown in FIG. 5, in one envisaged implementation the apparatus 10 may be associated with a brewing component that comprises a typical coffee percolator which is capable of passing hot water through ground coffee to provide a cup or jug of coffee. The brewing component comprises a filter that is arranged to receive ground coffee beans from the grinding chamber 16 and is operable to pass hot water through that ground coffee and into a receptacle. In one envisaged arrangement the grinding device 16 is configured to allow ground coffee to fall under gravity into the brewing device 40. For example, the grinding chamber 16 may have an opening in the base thereof that may be opened to allow ground coffee beans to fall therethrough. Alternatively however the grinding chamber 16 may have a mesh base portion configured to allow ground coffee to fall through the mesh openings progressively as it is ground.

Operation of the apparatus 10 depicted in FIG. 1 will now be described. In particular, with reference to FIG. 8, a measure of unroasted ("green") coffee beans are poured into the roasting chamber 12, for example via a trap-door (not shown) provided in the cover above the roasting chamber 12 or by means of the aforementioned dosing component.

Next, the heater is operated to heat the air in the vicinity of the roasting chamber 12. The air driving means 20 (such as a fan) is also operated to blow such heated air at a first (slower) speed defined by a selected profile through the openings 22 in the roasting chamber (see FIG. 1) into contact with the coffee beans contained therein. Such operation causes the beans to be heated, and more specifically roasted, as they are circulated round the periphery of the roasting chamber (see FIG. 9) so that they may be used to make coffee. Hot air from the air driving means 20 passes through the roasting chamber 12 and out of the opening 28 (n.b. the optional filter module is not shown) in the cover member 26 via the connecting channel 24.

Figure 9:
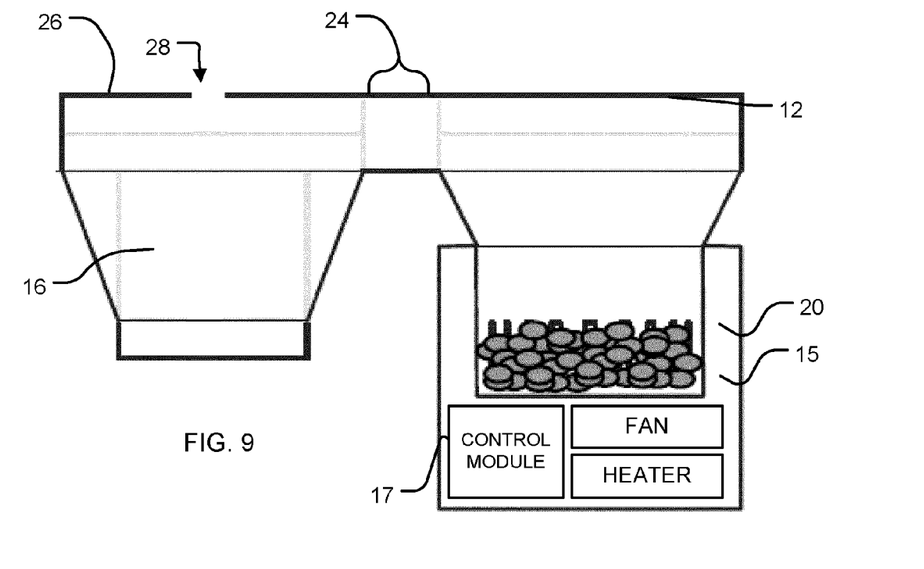

During the roasting process the skins (or hulls) of the unroasted ("green") coffee beans break away from the coffee beans. Such skins, once removed from the beans, are referred to as chaff. In a preferred arrangement, when the air driving means 20 is blowing at the first (slower) speed the chaff created by the roasting process is blown—in this particular embodiment—into the grinding chamber for grinding with roasted coffee beans (it being the case that grinding the chaff has no or negligible effect upon the taste of coffee brewed from a mixture of ground chaff and coffee).

Figure 10:
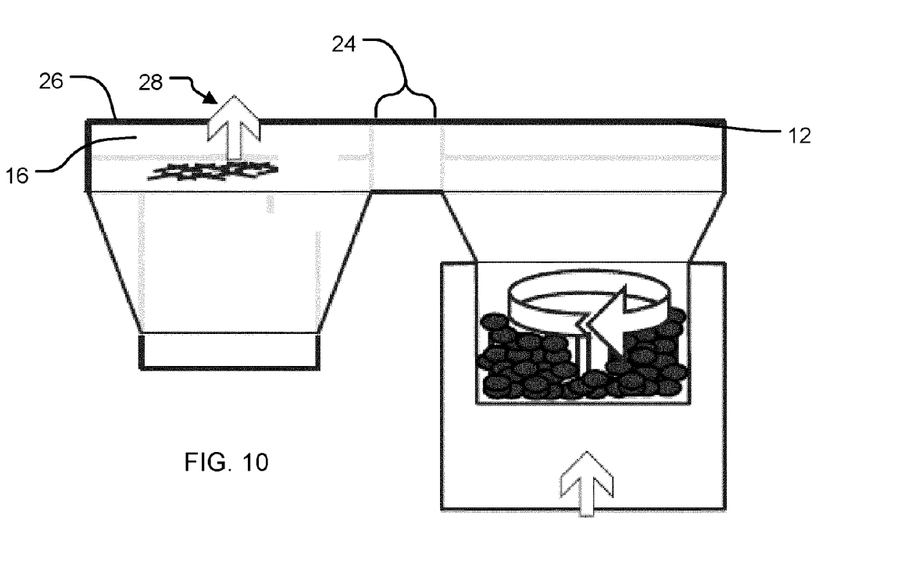

Now with reference to FIG. 10, once the coffee beans in the storage/hopper chamber 12 have been sufficiently roasted, the rate at which air is driven into the chamber by the air driving means 20 is increased to a second (higher) rate so as to blow the roasted coffee beans into the grinding chamber 16 via the connecting channel 24. In a preferred arrangement the air within the roasting chamber 12 is blown in a circular (or cyclonic) fashion to drive the roasted coffee beans up the internal walls of the roasting chamber 12 and into and through the connecting channel 24.

Figure 11:
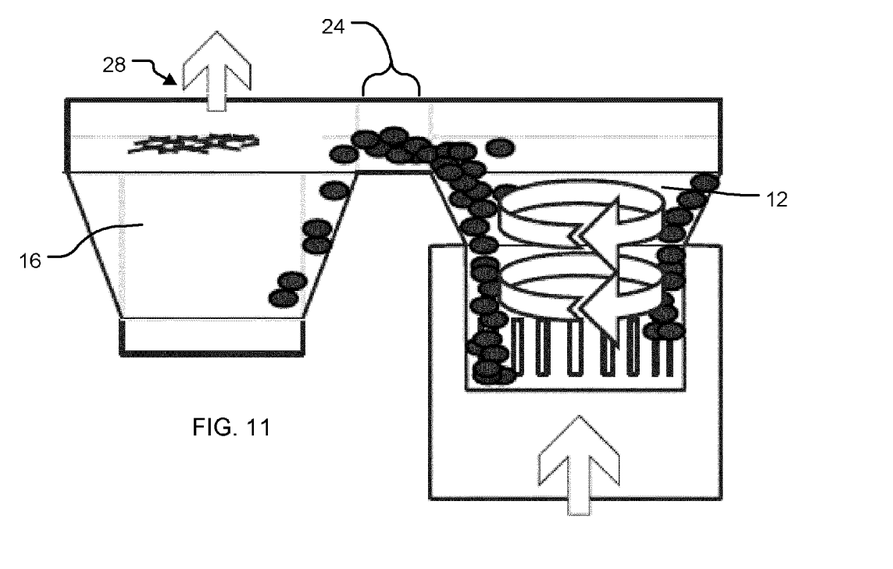
Figure 12:
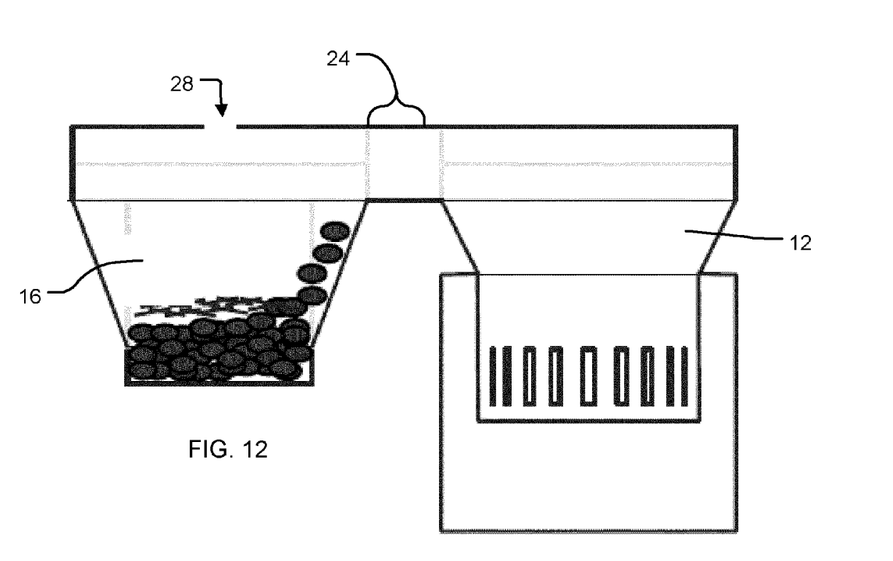

Now with reference to FIG. 11, once the roasted coffee beans have been blown into the grinding chamber 16 the air driving means 20 is turned off. As aforementioned, the ground coffee beans (and ground chaff), or at least some of it, may then be received in a brewing device 40 in order to make drinking coffee or in a receptacle for storage. In another embodiment roasted beans and chaff may be received into a storage receptacle via the channel 24.

Figure 14:
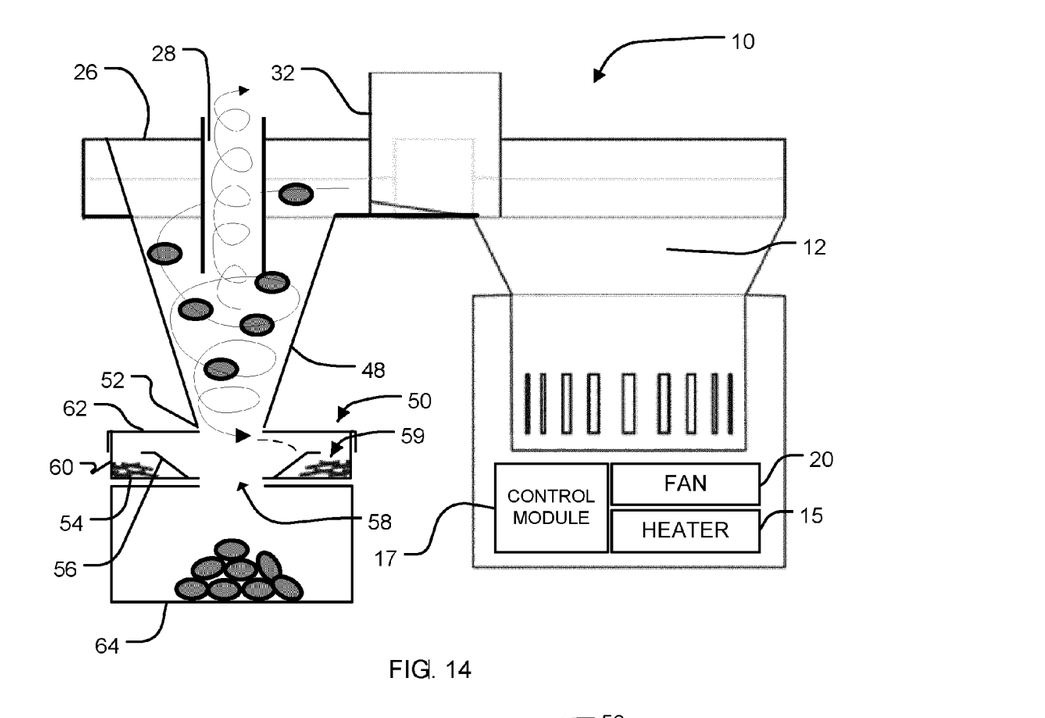
FIG. 14 is a schematic cross-sectional view of another apparatus embodying the teachings of the present invention.

FIG. 14 is a schematic cross-sectional view of another apparatus that embodies the teachings of the present invention. In the particular arrangement depicted in FIG. 14, the apparatus is configured to roast green coffee beans and then output the roasted beans to a storage receptacle. It will be appreciated, however, that the apparatus depicted may be configured (as in other arrangements mentioned herein) to output roasted beans to a grinder, or to a grinder that grinds the beans for subsequent use in a brewer.

With this in mind, the apparatus 10 comprises a roasting chamber 12 that is fed with hot air by a fan 20 and heater 15 that are each under the control of a control module 17. As with previous arrangements, the fan 20 is configured to be run at a first lower fan speed or range of fan speeds to circulate beans in the roasting chamber, before being run at a second higher fan speed or range of fan speeds to drive roasted beans from the roasting chamber 12.

As aforementioned, chaff is produced during the bean roasting process and this chaff is carried (by the air injected into the roasting chamber) through the roasting chamber outlet and into a vortex generator 48 that functions as a cyclonic separator. The vortex generator 48 is configured so that air from the roasting chamber 12 enters tangentially to the circumference of the vortex generator 48 and forms a vortex or cyclone that carries the chaff circumferentially around and down through the vortex generator. In a manner that is well known in the art, as the air circulates through the vortex generator centrifugal forces separate and pull the chaff from the airstream to the sides of vortex generator, whilst the air exits through the outlet 28.

Figure 15:
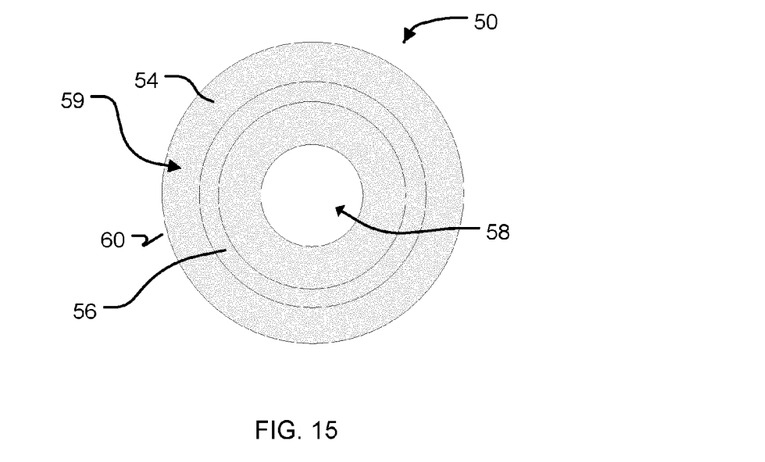
FIG. 15 is a plan view of part of a component of the apparatus depicted in FIG. 14.

A chaff collector 52 is located immediately below the cyclonic separator outlet 50, The chaff collector 52 comprises an annular base 54 that has a conical inner wall 56 running around the periphery of a central aperture 58, and a taller outer circular wall 60 that is concentric with the inner wall 56. The base 54 and inner and outer walls 58, 60 co-operate to define an internal storage space 59, and the chaff collector is closed by an annular lid 62 (the hole in the lid 62 being sized to co-operate with the outlet 52 of the vortex generator 48). FIG. 15 is a plan view of the chaff collector base 54 with the lid 62 removed.

As will be appreciated by persons skilled in the art, as the chaff leaves the outlet 52 of the vortex generator 48, the chaff will tend to continue to move radially outwardly through a gap between the shorter inner wall 56 and the chaff collector lid 62 before coming to rest in the storage space 59. In contrast, heavier roasted beans will move radially outwardly to a lesser extent and will tend to drop down through the aperture 58 in the chaff collector base 54 and into a storage receptacle 64 provided therebelow. The conical shape of the inner wall helps the roasted beans to fall down into the receptacle rather than end up in the chaff collector.

In this arrangement, therefore, the chaff produced during the roasting process tends to end up in the chaff collector 50, rather than being mixed in with the roasted beans (as in some previous arrangements). As such, with this arrangement it is possible to avoid grinding up most if not all of the chaff with the roasted beans.

In a preferred arrangement, the chaff collector is removable from the apparatus 10, and the lid 62 can be separated from the base 54 to allow chaff that has collected in the storage space 59 to be disposed of.

Another aspect of the present invention deals with the fact that the roasting temperature and roasting time are not the same for all types of coffee bean. Specifically, to provide high quality coffee, different types of coffee beans should be roasted for different amounts of times and/or at different temperatures. To achieve this, the control module 17 may include the aforementioned memory that is configured to store one or more roasting process profiles, where each said process profile provides instructions to the control module to roast the beans for different amounts of times and/or at different temperatures depending on the program selected. Such process profiles may also be configured to operate the air driving means 20 for different amounts of times and/or at different rates depending on the program selected. The process profiles may also define a period of time during which cooler air is injected into the roasting chamber to quench the roasted beans.

In one arrangement a particular process profile may be selected by a user by pressing a button provided on the apparatus 10 or by entering a code into a keypad (not shown) on the apparatus. However, with reference to FIG. 13, in another arrangement the apparatus 10 is provided with a detector (such as a barcode reader 42 or RFID reader) that is configured to wirelessly detect an indicator (such as a barcode 44 or RFID tag) on packaging 46 in which unroasted coffee beans intended for use with the apparatus 10 are provided. Once a given indicator has been read by the apparatus, the control means controls the apparatus to operate in accordance with instructions encoded within the indicator, or to select a process profile from memory that is identified by said instructions.

In one arrangement, the memory may be loadable with new or additional process profiles (for example by means of an external interface, such as a USB or wireless interface for example). In another envisaged arrangement the indicator 44 may be contain a machine readable code (e.g. a barcode for example) that contains instructions for operating the device 10.

Figure 13:
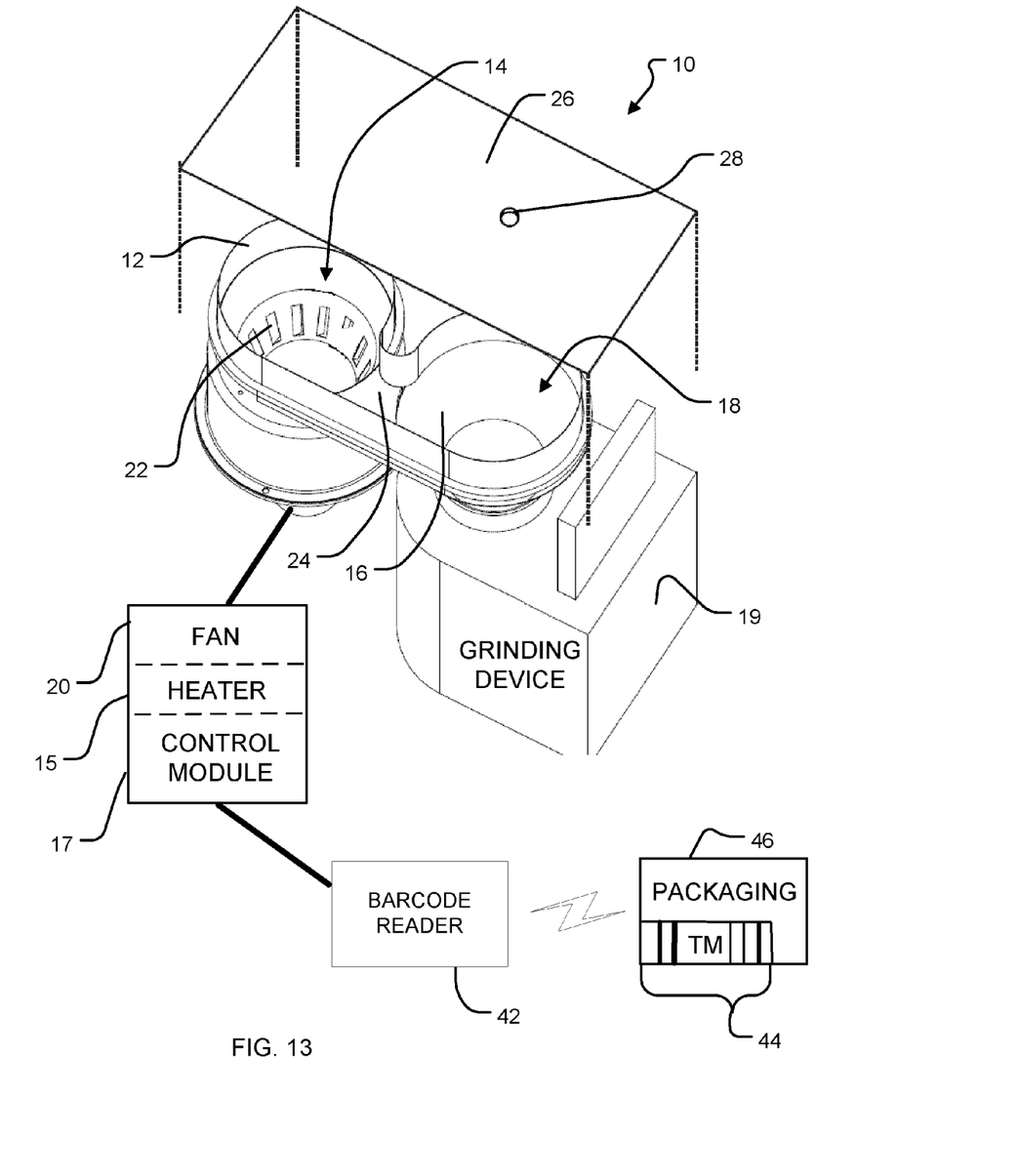
FIG. 13 is a perspective view of another apparatus embodying the teachings of the present invention.

In one further envisaged arrangement, the indictor 44 (e.g. barcode 44) may partly comprise (or have included therein or adjacent to) an emblem that designates the coffee beans as being from an authorised source. In such an arrangement, when the detector 42 is used to read a machine readable code embedded within an indicator 44 in order to operate the apparatus 10, the control module 17 may be configured not to operate the device 10 if the aforementioned emblem is not detected. This arrangement prevents the apparatus from being used with coffee beans from an unauthorised source. It will be appreciated that whilst various aspects and embodiments of the present invention have heretofore been described, the scope of the present invention is not limited to the particular arrangements set out herein and instead extends to encompass all arrangements, and modifications and alterations thereto, which fall within the spirit and scope of the appended claims.

For example, whilst the apparatus described herein is configured to operate automatically, it will be appreciated that the apparatus could instead be configured to operate manually. For example, a series of controls could be provided to enable a user to manually set roasting times/ temperatures, and to activate the air driving means to blow coffee beans from the roasting chamber to the grinding chamber.

Furthermore, whilst the aforementioned embodiments describe apparatus where the roasting and storage/hopper chambers are adjacent one another, it will be appreciated that the roasting chamber could be located above the grinding chamber so that roasted beans fall into the grinding chamber under gravity. In this configuration the apparatus may comprise one or more movable gates that function to hold coffee beans in the roasting chamber whilst they are being roasted, and which may be opened to allow roasted coffee beans to drop from the roasting chamber into the grinding chamber. In yet further envisaged arrangements, roasting of the coffee beans may be accomplished by means other than heated air. For example, one or more heating elements could be provided for directly heating the coffee beans, and the air driving means could be provided to agitate coffee beans whilst they are being roasted and to transfer beans from the roasting component to the grinding component.

It should also be noted that whilst the accompanying claims set out particular combinations of features described herein, the scope of the present invention is not limited to the particular combinations hereafter claimed, but instead extends to encompass any combination of features herein disclosed.

The invention claimed is:

1. An apparatus for roasting coffee beans, the apparatus comprising:
a chamber in which a supply of coffee beans can be received for roasting, said chamber having an outlet for roasted coffee beans;
a heater for heating air;
an air driver for driving heated air into the chamber to roast coffee beans received therein, and for driving air into the chamber to lift roasted coffee beans from the chamber to and through said outlet; and
a controller operable to control the air driver to vary a rate at which air is driven into the chamber,
wherein the air driver and the chamber are configured and arranged so that coffee beans located in the chamber circulate generally horizontally about a periphery of the chamber when the air driver drives heated air into the chamber, said controller being configured to control the air driver to drive air into the chamber at a first rate to circulate the beans as they roast, and at a second rate higher than the first to lift the beans towards and through the outlet.

2. The apparatus according to claim 1, wherein at least a portion of said chamber is generally conical and expands in diameter towards said outlet.

3. The apparatus according to claim 1, wherein said chamber is configured to define one or more air inlets, the air driver being configured to drive air through said one or more inlets into said chamber.

4. The apparatus according to claim 3, wherein said one or more air inlets are arranged circumferentially around a peripheral wall of the roasting chamber, said inlets being configured so that air enters the chamber tangentially to the peripheral wall of the chamber to horizontally circulate the beans.

5. The apparatus according to claim 3, wherein said air inlets extend radially in a base part of the roasting chamber, said inlets being configured so that air enters the chamber at an angle to the plane of the base part to horizontally circulate the beans.

6. The apparatus according to claim 1, wherein the air driver is operable to drive cooler air into the chamber to quench the roasted beans.

7. The apparatus according to claim 6, wherein the air driver is configured to drive cooler air into the chamber to quench the roasted beans and lift the beans towards the outlet.

8. The apparatus according to claim 1, wherein said first rate comprises a range of rates and the controller is configured to vary, within said range, the rate at which air is driven into the chamber to account for changes in volume and weight of the beans as they roast.

9. The apparatus according to claim 8, wherein the controller is configured to vary the rate at which air is driven into the chamber in accordance with a predetermined process profile.

10. The apparatus according to claim 9, wherein said predetermined process profile defines, for a given roasting process, variations in the rate at which hot air is to be driven into the chamber over time.

11. The apparatus according to claim 10, wherein said process profile is tailored for a particular type of coffee bean, said process profile being selectable by said controller in accordance with the type of beans to be roasted.

12. The apparatus according to claim 11, comprising an input interface operable by a user to indicate to the controller a type of beans to be roasted, the controller being responsive to information input by means of said interface to select a process profile that is appropriate for the type of beans to be roasted from a profile process store.

13. The apparatus according to claim 1, comprising a vortex generator in fluid communication with said roasting chamber outlet, said vortex generator being configured to induce a vortex or cyclone in air exiting said roasting chamber through said outlet.

14. The apparatus according to claim 13, wherein the vortex generator has an outlet for roasted beans and chaff, the vortex being configured to separate chaff and roasted beans from the air flowing into the vortex generator from the roasting chamber, the apparatus further comprising a chaff collector into which roasted beans and chaff pass from the vortex generator outlet.

15. The apparatus according to claim 14, wherein the chaff collector is configured to separate the chaff from the air that passes into the collector from the vortex generator, said chaff collector being configured to store said separated chaff whilst allowing the roasted beans to pass therethrough.

16. The apparatus according to claim 1, further comprising a grinding module in communication with said outlet, the grinding module being configured to receive roasted coffee beans from said chamber via said outlet and to grind said roasted coffee beans.

17. The apparatus according to claim 16, comprising a brewing module configured to receive ground coffee beans from said grinding module, and to pass heated water through said ground coffee beans and into a receptacle.

18. An apparatus for roasting and grinding coffee beans, the apparatus comprising:
a roasting chamber in which a supply of coffee beans can be received for roasting, the roasting chamber comprising an outlet for roasted coffee beans;
a grinding module in fluid communication with the outlet of the roasting chamber;
a heater for heating air;
an air driver for driving heated air into the roasting chamber for roasting coffee beans received therein; and a controller operable to control the air driver to vary a rate at which air is driven into the roasting chamber;

wherein the air driver and the roasting chamber are configured and arranged so that coffee beans located in the roasting chamber circulate generally horizontally about a periphery of the roasting chamber when the air driver drives heated air into the roasting chamber to roast beans received therein, and the air driver is further operable to drive air into the roasting chamber to lift roasted coffee beans to and through said outlet and into said grinding module for grinding thereby, said controller being configured to control the air driver to drive air into the roasting chamber at a first rate to circulate the beans as they roast, and at a second rate higher than the first to lift the beans towards and through the outlet.

19. An apparatus for roasting and grinding coffee beans, and for brewing coffee from roasted and ground coffee beans, the apparatus comprising:

a roasting chamber in which a supply of coffee beans can be received for roasting, the roasting chamber comprising an outlet for roasted coffee beans;

a grinding module in fluid communication with the outlet of the roasting chamber;

a brewing module in fluid communication with an outlet of the grinding module, the brewing module being configured to receive ground coffee from the grinding module and to pass heated water through the ground coffee into a receptacle;

a heater for heating air;

an air driver for driving heated air into the roasting chamber for roasting coffee beans received therein; and a controller operable to control the air driver to vary a rate at which air is driven into the roasting chamber;

wherein the air driver and the roasting chamber are configured and arranged so that coffee beans located in the roasting chamber circulate generally horizontally about a periphery of the roasting chamber when the air driver drives heated air into the roasting chamber to roast beans received therein, and the air driver is further operable to drive air into the roasting chamber to lift roasted coffee beans to and through said outlet and into said grinding module for grinding thereby, said controller being configured to control the air driver to drive air into the roasting chamber at a first rate to circulate the beans as they roast, and at a second rate higher than the first to lift the beans towards and through the outlet.

20. The apparatus according to claim 18, further comprising a cyclonic separator located between said roasting chamber and said grinding module, said cyclonic separator being operable to separate chaff from the air passing therethrough.

21. The apparatus according to claim 19, further comprising a cyclonic separator located between said roasting chamber and said grinding module, said cyclonic separator being operable to separate chaff from the air passing therethrough.

* * * * *